United States Patent
Szigeti et al.

(10) Patent No.: US 12,107,854 B2
(45) Date of Patent: Oct. 1, 2024

(54) CONTINUOUS MULTIFACTOR AUTHENTICATION SYSTEM INTEGRATION WITH CORPORATE SECURITY SYSTEMS

(71) Applicant: Cisco Technology, Inc., San Jose, CA (US)

(72) Inventors: Thomas Szigeti, Vancouver (CA); Alan Robert Lynn, Burke, VA (US); David John Zacks, Vancouver (CA); Frank Michaud, Pully (CH)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/344,527

(22) Filed: Jun. 29, 2023

(65) Prior Publication Data

US 2023/0344830 A1  Oct. 26, 2023

Related U.S. Application Data

(63) Continuation of application No. 17/225,824, filed on Apr. 8, 2021, now Pat. No. 11,706,214.

(51) Int. Cl.
*H04L 9/40* (2022.01)
*H04L 67/55* (2022.01)

(52) U.S. Cl.
CPC ........ *H04L 63/0861* (2013.01); *H04L 63/107* (2013.01); *H04L 63/20* (2013.01); *H04L 67/55* (2022.05); *H04L 2463/082* (2013.01)

(58) Field of Classification Search
None
See application file for complete search history.

(56) References Cited

U.S. PATENT DOCUMENTS

| | | | |
|---|---|---|---|
| 9,706,406 B1 * | 7/2017 | Adams | G06F 21/32 |
| 2003/0103652 A1 * | 6/2003 | Lee | G06V 40/172 |
| | | | 382/118 |
| 2004/0117638 A1 * | 6/2004 | Monroe | G08B 25/016 |
| | | | 713/186 |
| 2004/0236701 A1 | 11/2004 | Beenau et al. | |
| 2015/0109428 A1 * | 4/2015 | Mechaley, Jr. | G06V 10/95 |
| | | | 348/77 |
| 2015/0138332 A1 | 5/2015 | Cheng et al. | |
| 2016/0180068 A1 | 6/2016 | Das et al. | |
| 2016/0371540 A1 | 12/2016 | Pabbichetty | |

(Continued)

*Primary Examiner* — William J. Goodchild
(74) *Attorney, Agent, or Firm* — Polsinelli P.C.

(57) ABSTRACT

Disclosed herein are systems, methods, and computer-readable media for increasing security of devices that leverages an integration of an authentication system with at least one corporate service. In one aspect, a request is received from a user device to authenticate a person as a particular user by the authentication system. A photo of the person attempting to be authenticated as the particular user is captured. Nodal points are mapped to the captured photo of the person attempting to be authenticated, and the nodal points from the photo are compared against a reference model for facial recognition of the particular user. It is then determined whether the nodal points match the reference model for the particular user. The present technology also includes sending a command to the user device to send data to identify the person, and/or a location of the user device.

19 Claims, 9 Drawing Sheets

(56) References Cited

U.S. PATENT DOCUMENTS

| | | |
|---|---|---|
| 2018/0041506 A1 | 2/2018 | Han et al. |
| 2020/0153872 A1 | 5/2020 | Drako et al. |
| 2020/0294339 A1 | 9/2020 | Rao et al. |
| 2020/0322330 A1 | 10/2020 | Lynn et al. |
| 2020/0344238 A1 | 10/2020 | Ainsworth et al. |

* cited by examiner

320

```
Receiving a photo of a particular user from a corporate directory by an authentication
system
322
```

↓

```
Creating, by the authentication system, a reference model for authenticating the
particular user by facial recognition using the photo of the particular user from a
corporate directory and a reference image of the particular user captured by user
equipment
324
```

↓

```
Receiving a request from a person to authenticate the person as the particular user by
the authentication system to a device or service
326
```

↓

```
Comparing a current image of the person captured by the user equipment against the
reference model
328
```

↓

```
Authenticating the person as the particular user to the device or service when the
current image sufficiently matches the reference model
330
```

FIG. 3B

CONTINUOUS MULTIFACTOR AUTHENTICATION SYSTEM INTEGRATION WITH CORPORATE SECURITY SYSTEMS

CROSS-REFERENCE TO RELATED APPLICATIONS

This application is a continuation of U.S. application Ser. No. 17/225,824, filed on Apr. 8, 2021, which is expressly incorporated by reference herein in its entirety.

DESCRIPTION OF THE RELATED TECHNOLOGY

The present technology pertains to increasing the security of devices that leverage integration of an authentication system with at least one corporate service. Specifically, the present technology discloses means to augment and verify data received from a user device by using outside data, such as data present in a corporate directory.

SUMMARY

Security breaches are a major problem facing today's enterprises. The average cost of a security breach has risen to over 8 million dollars, and approximately one-quarter of these breaches are committed by internal actors, whether intentionally or accidentally. Disincentivizing security breaches would be a major boon to today's enterprises, saving them money, loss of trust, and PR debacles.

Identifying those who commit security breaches provides a major disincentive to those who would otherwise commit such crimes, and also offers enterprises the chance to be compensated for their trouble. However, existing solutions to this problem have done an insufficient job at disincentivizing internal security breaches.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which:

FIGS. 3A, 3B, 3C, 3D, and 3E are flowcharts of example methods for increasing security of devices in accordance with some aspects of the present technology.

DETAILED DESCRIPTION

Figure 1:
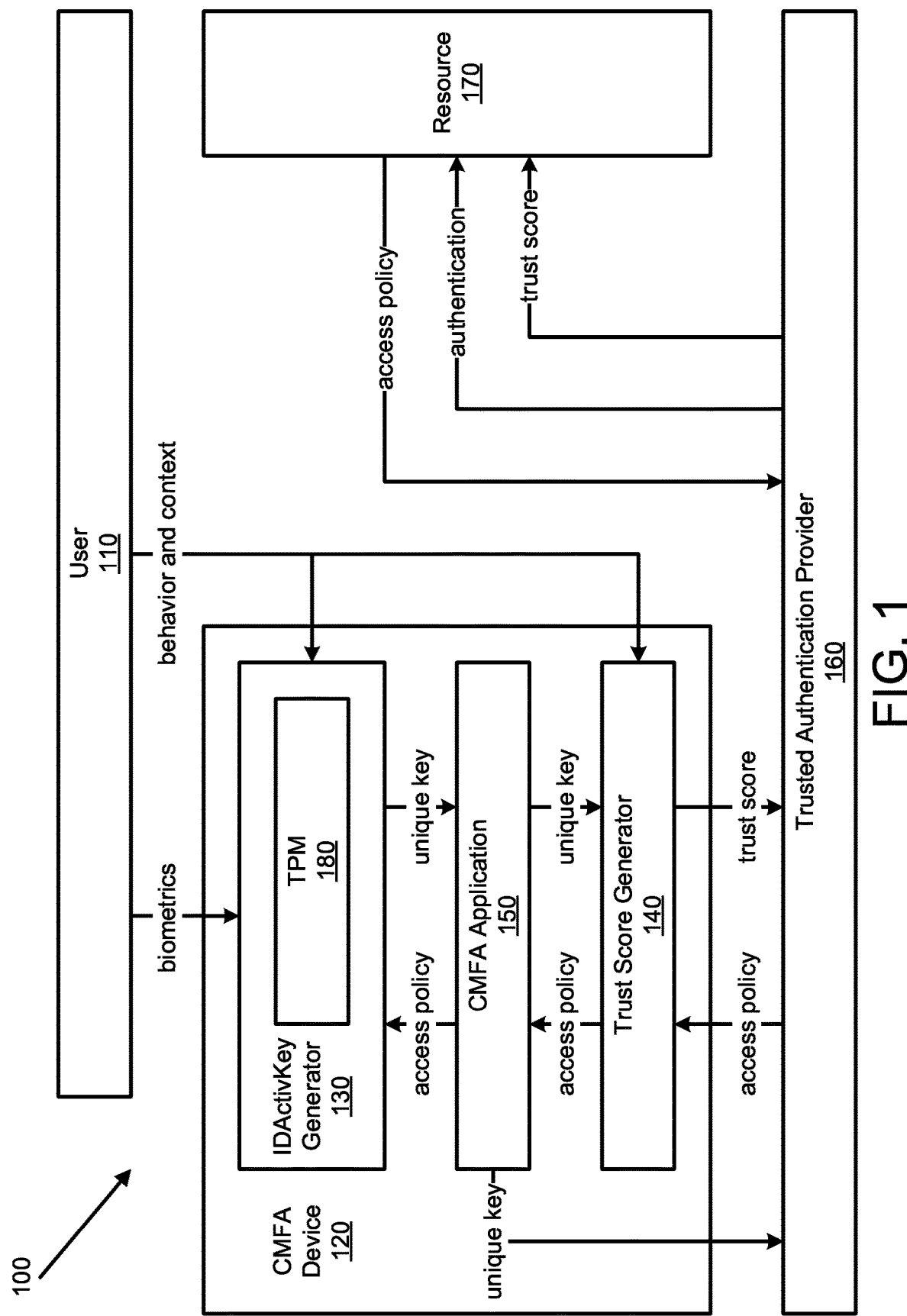
FIG. 1 illustrates an example continuous multi-factor authentication (CMFA) system in accordance with some aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for the convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control. Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Overview

The present technology provides for increasing security of devices that leverage an integration of an authentication system with at least one corporate service.

A method can include receiving a request from a user device to authenticate a person as a particular user by the authentication system. The method can also include capturing a photo of the person attempting to be authenticated as the particular user. The method can also include mapping nodal points to the captured photo of the person attempting to be authenticated as the particular user to a device or service. The method can also include comparing the nodal points from the photo against a reference model for facial recognition of the particular user. The method can also include determining that the nodal points do not sufficiently match the reference model for the particular user. The method can also include sending a command to the user device to send data to identify the person, and/or a location of the user device.

In some embodiments of the method, the command is to send the captured photo of the person that attempted to be authenticated as the particular user.

In some embodiments of the method, the command is to record and send video and/or audio data.

The method can further include, prior to sending the command, receiving a communication from a second device operated by a second person who is authenticated as the particular user stating that the user device is lost or stolen.

A non-transitory computer-readable medium can have stored therein instructions which, when executed by a processor, cause the processor to perform operations. The operations can include receiving a request from a user device to authenticate a person as a particular user by the authentication system. The operations can also include capturing a photo of the person attempting to be authenticated as the particular user. The operations can also include mapping nodal points to the captured photo of the person attempting to be authenticated as the particular user to a device or service. The operations can also include comparing the nodal points from the photo of the person against a reference model for facial recognition of the particular user. The operations can also include determining that the nodal points do not sufficiently match the reference model for the particular user. The operations can also include sending a notification to a corporate security service.

In some embodiments of the non-transitory computer-readable medium, the corporate security service includes a location services platform, and the instructions are further effective to cause the processor to perform operations including determining a current location of the user device.

In some embodiments of the non-transitory computer-readable medium, the instructions are further effective to cause the processor to perform operations including instructing a video surveillance system to stream video from cameras in a vicinity of the current location of the user device to security personnel.

In some embodiments of the non-transitory computer-readable medium, the instructions are further effective to cause the processor to perform operations including instructing a video surveillance system to record video from cameras in a vicinity of the current location of the user device. The instructions are further effective to cause the processor to perform operations including tagging the recorded video with an automatically generated incident case file.

In some embodiments of the non-transitory computer-readable medium, the instructions are further effective to cause the processor to perform operations including sending the captured photo of the person who was not authenticated as the particular user to a video surveillance system and instructing the video surveillance system to perform facial recognition of objects within view of the video surveillance system to identify the person in the captured photo.

In some embodiments of the non-transitory computer-readable medium, the video surveillance system can identify the person and track the person.

A system can include an authentication server, a user device, an authentication application configured to execute on the user device, and a corporate service. The authentication application is configured to communicate with the authentication server, wherein a function of the authentication application is to authenticate that a person operating the user device is a particular user. The corporate service is configured to communicate with the authentication server.

In some embodiments of the system, the corporate service is a corporate directory, and the authentication server is configured to receive a photo of the particular user from the corporate directory. The authentication server is also configured to create a reference model for authenticating the particular user by facial recognition using the photo of the particular user from the corporate directory and a reference image of the particular user captured by user equipment.

In some embodiments of the system, the corporate service is a corporate directory, and the authentication server is configured to receive a communication from the authentication application indicating that a person has unsuccessfully attempted to authenticate as the particular user of the user device. The communication includes a photo of the person captured by the user device. The authentication server is further configured to compare the photo of the person captured by the user device against photos in the corporate directory to attempt to identify the person that has unsuccessfully attempted to authenticate as the particular user of the user device.

In some embodiments of the system, the authentication application is further configured to receive a request from the user device to authenticate a first person as the particular user by an authentication system. The authentication application is also configured to capture a photo of the person attempting to be authenticated as the particular user. The authentication application is also configured to map nodal points to the captured photo of the first person attempting to be authenticated as the particular user to a device or service. The authentication application is also configured to determine that the first person in the captured photo does not sufficiently match a reference model for the particular user, whereby the first person is not authenticated as the particular user. The authentication application is also configured to receive a subsequent request from the user device to authenticate a second person as the particular user. The authentication application is also configured to successfully authenticate the second person as the particular user. The authentication application is also configured to, after successfully authenticating the second person as the particular user, present the captured photo of the first person that was not authenticated as the particular user.

In some embodiments of the system, the authentication application is further configured to receive a request from the user device to authenticate the person as the particular user by an authentication system. The authentication application is also configured to capture a photo of the person attempting to be authenticated as the particular user. The authentication application is also configured to map nodal points to the captured photo of the person attempting to be authenticated as the particular user to a device or service. The authentication application is also configured to determine that the person in the captured photo does not sufficiently match a reference model for the particular user, whereby the person is not authenticated as the particular user. The authentication application is also configured to notify the authentication server that the person in the captured photo does not sufficiently match the reference model for the particular user. The authentication application is also configured to receive a command from the authentication server to send data to identify the person, and/or a location of the user device.

In some embodiments of the system, the corporate service is a corporate security service.

In some embodiments of the system, the authentication server is configured to communicate with the corporate security service to cause a video surveillance system to stream video from cameras in a vicinity of a current location of the user device to security personnel.

In some embodiments of the system, the authentication server is configured to communicate with the corporate security service to cause a video surveillance system to record video from cameras in a vicinity of a current location of the user device. The authentication server is also configured to tag the recorded video with an automatically generated incident case file.

In some embodiments of the system, the authentication server is configured to capture and send a photo of the person who was not authenticated as the particular user to a video surveillance system. The authentication server is also configured to communicate with the corporate security service to instruct the video surveillance system to perform facial recognition of objects within view of the video surveillance system to identify the person in the captured photo.

In some embodiments of the system, the video surveillance system is configured to identify and track the person.

Description of Example Embodiments

Security breaches are a serious problem for enterprise operations. In 2020, the average cost of a security breach was over $8 m per breach. Furthermore, approximately 25% of these breaches were caused by malicious internal actors, and a significant portion of these were attributed to lost or stolen devices.

Multi-factor authentication and continuous multi-factor authentication systems, such as Cisco's BodyGuard, provide some protection against unauthorized security breaches by malicious internal actors. Insofar as these malicious internal actors will need to circumvent multiple authentication factors on a lost, stolen, or just unattended device, using these authentication systems can mitigate the extent and number of internal security breaches. However, existing systems do not provide enterprises with means of identifying, apprehending, and prosecuting these malicious internal actors.

The present technology addresses this problem. By implementing such a technology, malicious internal actors will be disincentivized from committing security breaches, and when they do, they can be identified, apprehended, and prosecuted, preventing further breaches from occurring and granting the enterprise compensation.

The present technology increases the security of devices by leveraging integration of an authentication system with at least one corporate service. For instance, a corporate service could be a corporate directory used to identify the perpetrator with facial recognition technology. Or, the corporate service could be a corporate security system which can deploy video monitoring of sensitive areas. By integrating the authentication system with a corporate service, the present technology allows enterprises to identify, apprehend, and ultimately prosecute malicious internal actors who use others' devices to gain unauthorized access to sensitive resources.

This disclosure will first discuss an example continuous multi-factor authentication (CMFA) system. Then, the disclosure will discuss example embodiments for increasing the security of devices that leverages an integration of an authentication system with at least one corporate service. Finally, the disclosure will discuss an example computing system which can be used to execute the present technology.

FIG. 1 illustrates an example continuous multi-factor authentication (CMFA) system 100 in accordance with some aspects of the present technology. User 110 can gain authorized access to resource 170 by using CMFA device 120.

Resource 170 can be any service, resource, device, or entity which requires authentication of user 110. For example, resource 170 can be a social media service, bank, hospital, motor vehicle department, bar, voting system, Internet of Things (IOT) device, or access device. In some embodiments, resource 170 can be accessed by user 110 through an access device, such as a mobile phone or personal computer. In some embodiments, resource 170 can be accessed by user 110 through an application that is specifically designed for accessing resource 170, or through a more general application which can access multiple services, such as a web browser, or portions of an operating system. In some embodiments, resource 170 can be the same device as CMFA device 120. In some embodiments, resource 170 can be a plurality of resources, such as an access device and a service which receive separate authentications from trusted authentication provider 160.

Resource 170 can authenticate the identity of user 110 through trusted authentication provider 160, which can be in communication with CMFA device 120. Data gathered by CMFA device 120 can be used for authentication of user 110 to resource 170 via trusted authentication provider 160. Trusted authentication provider 160 can receive an identification credential, such as an IDActivKey, from CMFA device 120 via CMFA application 150 that is unique to resource 170 for user 110. Trusted authentication provider 160 can also receive a trust score from CMFA device 120 via trust score generator 140. Upon receiving an IDActivKey and a trust score, trusted authentication provider 160 can use this information in tandem with access requirements received from resource 170 to authenticate user 110 to resource 170.

To generate identification credentials, CMFA Device 120 can be associated with user 110 and can gather biometric, behavioral, and contextual data from user 110. The biometric, behavioral, or contextual data, or some combination thereof, can be used by IDActivKey generator 130 to generate a unique IDActivKey corresponding to resource 170. These biometrics can include, for example, fingerprints, facial detection, retinal scans, voice identification, or gait data, among other biometrics. For each resource 170, a cryptographic seed from a pseudo-arbitrary number generator in trusted platform module (TPM) 180 can be used to select a sampling of the biometric data to be used in an IDActivKey for the application in question. In some embodiments, the IDActivKey may only be derived when CMFA device 120 determines that certain behavioral and contextual requirements indicate compliance with a policy. In some embodiments, there can be a "master" IDActivKey that is used to gain access to trusted authentication provider 160.

In some embodiments, behavioral and contextual data can be used to ensure that the context of user 110 is acceptable as specified by a policy of resource 170. Behavioral and contextual data can be used by trust score generator 140, which can generate a trust score as a measure of confidence in the authentication of user 110, and as a measure of confidence that the authenticated user 110 is still present and behaving acceptably as specified by a policy of resource 170.

In some embodiments, trusted computing implementations, such as TPM 180, can rely on roots of trust. Roots of trust can provide assurances that the root has been implemented in a way that renders it trustworthy. A certificate can identify the manufacturer and evaluated assurance level (EAL) of TPM 180. Such certification can provide a level of confidence in the roots of trust used in TPM 180. Moreover, a certificate from a platform manufacturer may provide assurance that TPM 180 was properly installed on a system that is compliant with specific requirements so the root of trust provided by the platform may be trusted. Some implementations can rely on three roots of trust in a trusted platform, including roots of trust for measurement (RTM), storage (RTS), and reporting (RTR).

Trust score generator 140 can generate a trust score for user 110 using behavioral and contextual data, the surrounding environment, or other sources. For example, location information can be derived from the network that user 110 is using. These data can include information about location, movement, or device behavior. The trust score reflects a confidence level that user 110 complies with a policy specified by resource 170. This includes the confidence that user 110 is the person operating the current session.

Trusted authentication provider 160 can request updated IDActivKeys and trust scores at different intervals depending on the requirements specified by the access policies defined by resource 170. It can send new access policies received from resource 170 during a session to CMFA device 120. Trusted authentication provider 160 can shield private information from resource 170, providing authentication without revealing personal information such as birth dates, social security numbers, or marital status, etc. In some embodiments, trusted authentication provider 160 need only inform resource 170 that access should be granted, while in some embodiments trusted authentication provider 160 can send an IDActivKey to resource 170.

User 110 can be any user including an employee, contractor, client, member of an organization, or private individual, etc. attempting to access a service. User 110 can use an access device to access resource 170 which may or may not be the same device as CMFA device 120. In some embodiments, CMFA device 120 can be used to authenticate an access device.

CMFA device 120 can be hardware, software-only, or combinations thereof. CMFA device 120 can be a mobile device or a personal computer; it may or may not be the same device as access device. In some embodiments, CMFA device 120 can include secure hardware such as TPM 180. In some embodiments, one or more of IDActivKey generator 130, TPM 180, and trust score generator 140 can be located in a physically separate and secure portion of CMFA device 120.

While FIG. 1 only illustrates one application 190, and one resource 170, it should be appreciated that there can be any number of applications 190 or application providers 170. Each resource 170 can have an access policy, and any IDActivKey will be unique to each respective resource 170.

Figure 2A:
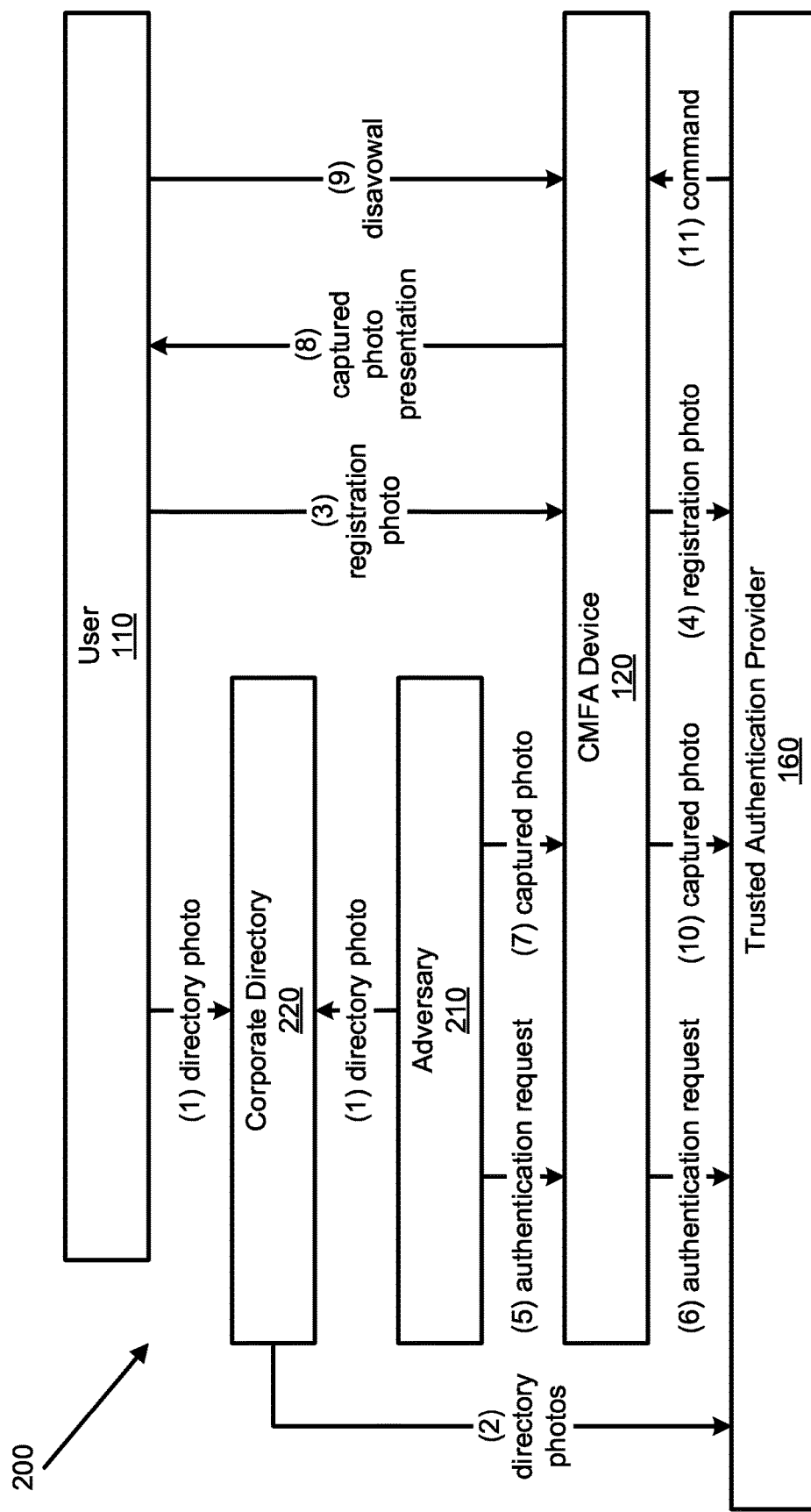
FIGS. 2A and 2B illustrate examples of multi-factor authentication systems integrated with a corporate service in accordance with some aspects of the present technology.
Figure 2B:
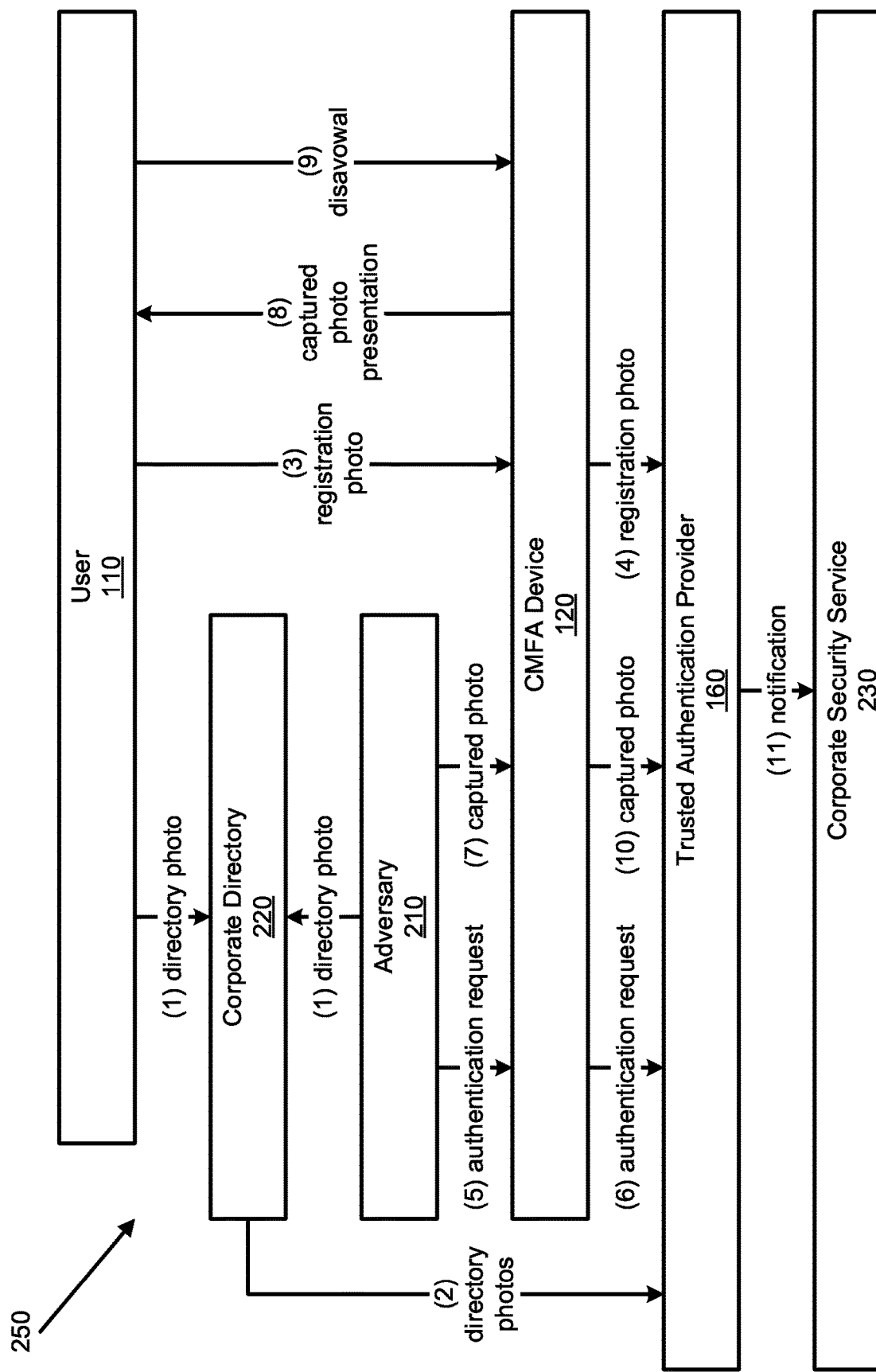

The system described in FIG. 1 is potentially vulnerable to internal security breaches. An adversary pretending to be user 110 could gain access to resource 170. FIGS. 2A and 2B illustrate systems which aim to prevent such unauthorized access by identifying the adversary.

FIG. 2A illustrates a multi-factor authentication system 200 for identifying an adversary 210. Adversary 210 is an unauthorized operator of CMFA device 120, and trusted authentication provider 160 ultimately requests data from CMFA device 120 to identify adversary 210. While an example collection of steps is illustrated in FIG. 2A, it will be appreciated that this is but one example.

Both user 110 and adversary 210, as employees, contractors, or affiliates of an enterprise can have photographs taken for corporate directory 220 and have these photos stored (1) within corporate directory 220. Corporate directory 220 can then send (2) these photographs to trusted authentication provider 160 for use in authentication processes. In some embodiments, trusted authentication provider 160 can store copies of the corporate directory photos. In some embodiments, corporate directory 220 can be queried by trusted authentication provider 160 whenever corporate directory photos are needed.

User 110, as the authorized user of CMFA device 120, can register with trusted authentication provider 160 by taking (3) a registration photo of user 110 with CMFA device 120 and sending (4) the registration photo to trusted authentication provider 160. Trusted authentication provider 160 can thus access both the registration photo of user 110 and the directory photos of user 110 and adversary 210 via corporate directory 220 to use in the continual identification of the user of CMFA device 120.

User 110 may leave CMFA device 120 unattended and in such a way that adversary 210 can begin to operate CMFA device 120 even though adversary 210 is an unauthorized user of CMFA device 120. Adversary 210 can aim to use the credentials of user 110, through CMFA device 120, to gain access to resources that adversary 210 is unauthorized to access. There are multiple methods by which adversary 210 could gain control of CMFA device 120. If CMFA device 120 were already unlocked and unattended, adversary 210 merely needs to begin operating CMFA device 120 to gain access to resources. If CMFA device 120 required some authentication to unlock, adversary 210 could spoof the identity of user 110 using a presentation attack or some other means to gain access to CMFA device 120. Adversary 210 could also take an unattended device to a hidden physical location, either within the same building to maintain access to the local network or elsewhere, to keep their identity hidden.

To facilitate access to a resource via CMFA device 120, adversary 210 can send (5, 6) an authentication request via CMFA device 120 to trusted authentication provider 160. In some embodiments, CMFA device 120 can be a different device than the access device used by adversary 210, in which case CMFA device 120 is used for any authentication but not as the client used for accessing the resource.

Based on the nature of CMFA device 120 or an associated access device, there are a number of ways in which adversary 210 could be caught. In some embodiments, the authentication request sent by adversary 210 will fail. This could be because adversary 210 has different biometrics than user 110, or because adversary 210 does not know an access password used by user 110, or due to other factors. In some embodiments, the authentication request sent by adversary 210 will succeed but adversary 210 will be caught later on. For instance, in CMFA systems, adversary 210 will be unlikely to maintain a high trust score, and thus the trust score for the user of CMFA device 120 can drop as adversary 210 continues to use it, and can eventually fall below a threshold that allows CMFA device 120 to access the resource. In some embodiments, no authentication factors will be required for adversary 210 to begin using CMFA device 120, and authentication could occur at intervals or after certain events, such as screen locks or new login sessions.

When adversary 210 is caught, whether due to a failed authentication, low trust score, or by another means, CMFA device 120 or an associated access device can capture (7) a picture of the current user, in this case, adversary 210, for later review. In some embodiments, CMFA device 120 can capture a picture of the current user at the request of trusted authentication provider 160. This request can be issued in response to an authentication request or factors other than a drop in trust score.

Sometime after adversary 210 has finished the session on CMFA device 120 or an associated access device, user 110 can return to CMFA device 120 or the associated access device. At this point, CMFA device 120 or the associated access device can present (8) the captured photo to user 110, asking for user 110 to state whether or not the captured photo is of user 110 or someone else. In order to present the captured photo to user 110, user 110 may need to authenticate to CMFA device 120 and trusted authentication provider 160, or raise the trust score above a specified level, or provide some additional credential since the device may suspect it was being used by an unauthorized user. As the photo is of adversary 210, user 110 can disavow (9) the photograph, stating that the photograph is not of user 110 but is rather of an unauthorized user, i.e. adversary 210. In some embodiments, user 110 can first be authenticated to trusted authentication provider 160 via CMFA device 120 before the captured photo is presented to user 110.

Based on the disavowal of user 110, CMFA device 120 or an associated access device can send (10) the captured photo to trusted authentication provider 160, which has access to directory photos from user 110 and adversary 210 as well as the registration photo from user 110. Once trusted authentication provider 160 has the captured photo, trusted authentication provider 160 can evaluate the captured photo with reference to the directory photos and the registered photo.

In some embodiments, trusted authentication provider 160 can generate a reference model for biometric recognition of user 110, including the use of facial recognition. This reference model can use data from the directory photo or the registration photo of user 110, or both.

Trusted authentication provider 160 can compare the captured photo with the reference model for user 110 to determine whether or not the person in the captured photo is user 110. In some embodiments, trusted authentication provider 160 can do this using nodal points. Nodal points are used in facial recognition technology; they represent the distinguishing elements of the facial topography that easily differentiate one face from another. Examples of nodal points include inter-eye distance, nose width, and jaw line length. Trusted authentication provider 160 can map nodal points to the captured photo and then compare these mapped nodal points to the reference model it created. In the present scenario, where the captured photo is of adversary 210 and the reference model is of user 110, trusted authentication provider 160 can determine that the nodal points do not sufficiently match the reference model. However, in situations where the captured photo is of user 110 and the reference model is also of user 110, trusted authentication provider 160 can authenticate user 110. In some embodiments, trusted authentication provider 160 can compare the mapped nodal points to the received directory photos to identify adversary 210.

In addition to determining that the captured photo does not match the reference model for user 110, trusted authentication provider 160 can search other reference models for other employees, contractors, or affiliates of the enterprise. These reference models can be built from the directory photos in corporate directory 220. If adversary 210 has a photo in corporate directory 220, trusted authentication provider 160 can identify that the captured photo best matches the directory photo of adversary 210 to help identify adversary 210 with the goal of eventual apprehension and prosecution.

Upon determining that the captured photo does not match the reference model, trusted authentication provider 160 can command (11) CMFA device 120 or an associated access device to do something in response to the unauthorized session by adversary 210.

In some embodiments, trusted authentication provider 160 can request data from CMFA device 120 or an associated access device. This data can include biometric, behavioral, or contextual information gathered by CMFA device 120, a location of CMFA device 120 or an associated access device during the unauthorized session, or other data. For instance, the command can be a command to record and send video and or audio data from CMFA device 120 or an associated access device to trusted authentication provider 160. This can be done discretely to avoid alerting adversary 210 of such monitoring, in the case that adversary 210 is still operating CMFA device 120 or an associated access device.

When trusted authentication provider 160 receives such data from CMFA device 120 or an associated access device, it can be used to help identify, apprehend, and prosecute adversary 210 for committing the data breach. Biometric data can be used when performing facial recognition against the photographs from corporate directory 220 to help identify adversary 210. Location data can be used to identify where the breach took place physically, and to look at security footage or send security personnel to that location in the hopes of apprehending adversary 210.

In some embodiments, prior to commanding CMFA device 120 or an associated access device, trusted authentication provider can receive a communication from another device operated by user 110 indicating that CMFA device 120 or an associated access device has been lost, stolen, or otherwise compromised. This information can give trusted authentication provider 160 greater assurance that an adversary 210 is operating CMFA device 120 or an associated access device instead of an authorized user 110.

FIG. 2B illustrates a multi-factor authentication system 250 for identifying an adversary 210 which is similar to the multi-factor authentication system 200 illustrated in FIG. 2A. Adversary 210 is an unauthorized operator of CMFA device 120, and trusted authentication provider 160 ultimately notifies corporate security service 230 about the security breach. While an example collection of steps is illustrated in FIG. 2B, it will be appreciated that this is but one example.

Steps 1-10 illustrated in FIG. 2B are substantially similar to those illustrated in FIG. 2A; the difference between the operation of the systems lies in the final step, wherein trusted authentication provider 160 can send (11) a notification to corporate security service 230 that an unauthorized adversary 210 was operating CMFA device 120 or an associated access device and potentially accessed sensitive resources. The notification can include information such as the length of time adversary 210 operated CMFA device 120 or an associated access device, what resources adversary 210 accessed, information regarding the identity of adversary 210 (potentially obtained through comparison with directory photos), or other factors. If multiple incidents have happened in a short amount of time or in the same location, the notification can include an overall threat level, which can increase in tandem with these factors or other factors.

In some embodiments, corporate security service 230 can include a location service which can determine the location of CMFA device 120 or an associated access device. These location services can be based on GPS location, an internal location service like Cisco's DNA Spaces, or other technologies. Based on the location of CMFA device 120 or the associated access device, corporate security service 230 can instruct a video surveillance system to stream or record video from cameras in the vicinity of CMFA device 120 or the associated access device. For instance, the video can be streamed to security personnel, recorded and tagged with an automatically generated incident case file, or processed in other ways. When pan-tilt-zoom cameras have been installed, they can be focused on the location of interest. Location-based monitoring is particularly useful when adversary 210 cannot be identified through the resources available in corporate directory 220, such as when adversary 210 is not an employee, contractor, or affiliate of the enterprise. In some cases, trusted authentication provider can directly notify security personnel in the vicinity of CMFA device 120 or the associated access device in order to more quickly apprehend adversary 210. If adversary 210 tries to flee, other methods of recognition, such as license plate recognition, can be employed.

For some corporate security services 230, trusted authentication provider 160 can send the captured photo to corporate security service 230, which can then forward the captured photo to the video surveillance system. Having received the captured photo, the video surveillance system can be instructed by corporate security service 230 to perform facial recognition or other identification on objects in view with the aim of identifying adversary 210. When adversary 210 is identified by the video surveillance system, the video surveillance system can track adversary 210. This information can be used by security personnel to apprehend adversary 210.

The disclosure turns to a discussion of methods which can be carried out by the systems illustrated in FIGS. 2A and 2B. FIGS. 3A, 3B, 3C, 3D, and 3E are flowcharts of methods for increasing security of devices in accordance with some aspects of the present technology.

Figure 3A:
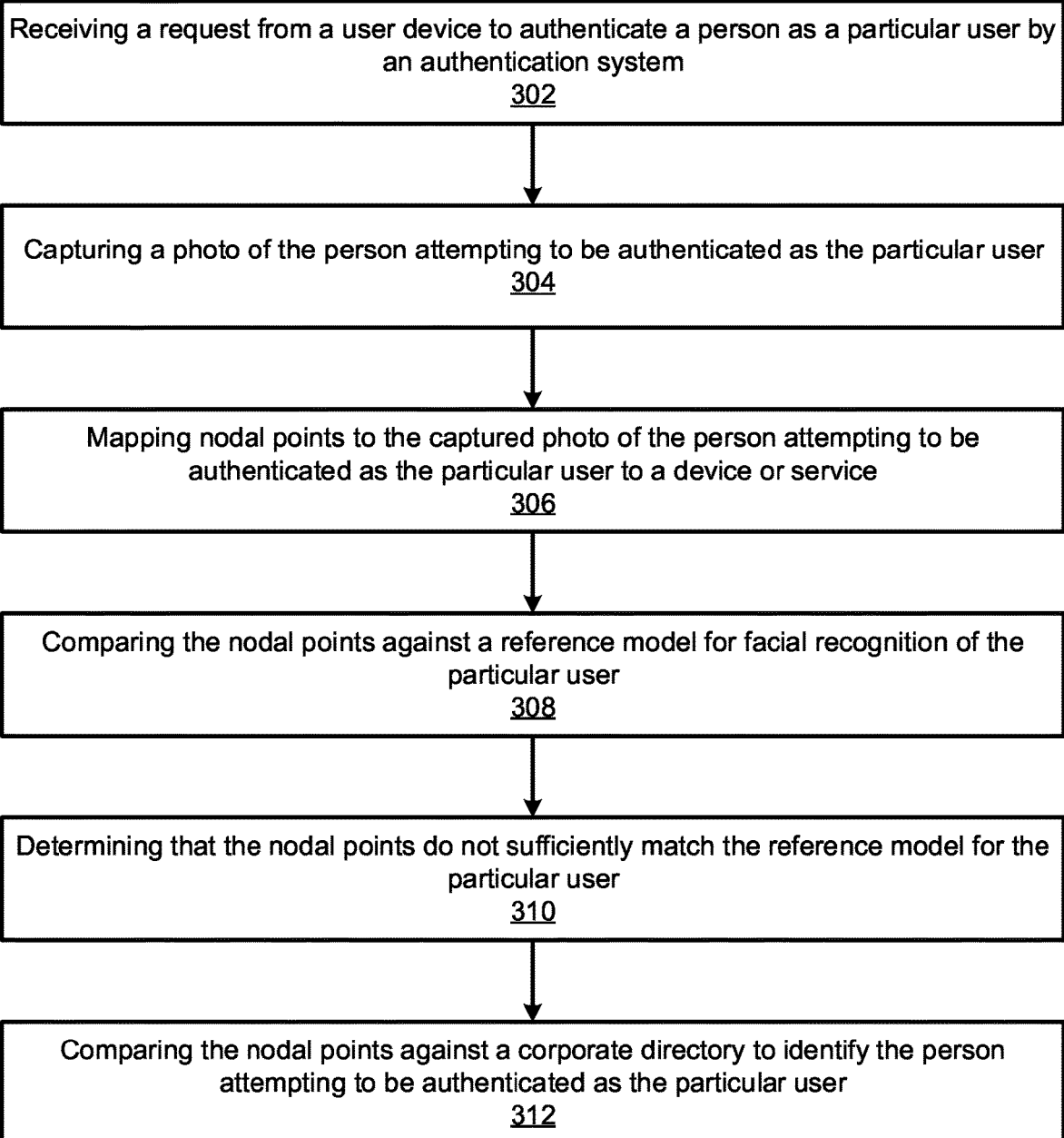

FIG. 3A illustrates an example method 300 for increasing security of devices that leverages integration of an authentication system with at least one corporate service. Although the example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

In some embodiments, the method 300 includes receiving a request from a user device to authenticate a person as a particular user by the authentication system at step 302. For example, as illustrated in FIGS. 2A and 2B, trusted authentication provider 160 may receive a request from CMFA device 120 to authenticate adversary 210 as user 110.

In some embodiments, the method 300 includes capturing a photo of the person attempting to be authenticated as the particular user at step 304. For example, as illustrated in FIGS. 2A and 2B, trusted authentication provider 160 may capture a photo adversary 210. Capturing the photo of the person attempting to be authenticated allows for later identification if the person attempting to be authenticated is an unauthorized user of the device.

In some embodiments, the method 300 includes mapping nodal points to the captured photo of the person attempting to be authenticated as the particular user to a device or service at step 306. For example, as illustrated in FIGS. 2A and 2B, trusted authentication provider 160 may map nodal points to the captured photo of adversary 210.

In some embodiments, the method 300 includes comparing the nodal points against a reference model for facial recognition of the particular user at step 308. For example, as illustrated in FIGS. 2A and 2B, trusted authentication provider 160 may compare the nodal points mapped to the captured photo of adversary 210 against a reference model for facial recognition of user 110.

In some embodiments, the method 300 includes determining that the nodal points do not sufficiently match the reference model for the particular user at step 310. For example, as illustrated in FIGS. 2A and 2B, trusted authentication provider 160 may determine that the nodal points mapped to the captured photo of adversary 210 do not sufficiently match the reference model for user 110. The fact that the nodal points do not match suggests that the user of the device is not the authorized user, and that the device may be operated by an adversary attempting a data breach.

In some embodiments, the method 300 includes comparing the nodal points against a corporate directory to identify the person attempting to be authenticated as the particular user at step 312. For example, as illustrated in FIGS. 2A and 2B, trusted authentication provider 160 may compare the nodal points mapped to the captured photo of adversary 210 against photos received from corporate directory 220 to identify adversary 210. As a corporate directory can contain photos of employees, contractors, or affiliates, this may allow the identification of the adversary operating the device. Once the adversary is identified, the adversary can be apprehended and prosecuted to disincentivize future data breaches and provide restitution for the current data breach.

FIG. 3B illustrates an example method 320 for increasing security of devices that leverages an integration of an authentication system with at least one corporate service. Although the example method 320 depicts a particular sequence of operations, the sequence may be altered without departing from the scope of the present disclosure. For example, some of the operations depicted may be performed in parallel or in a different sequence that does not materially affect the function of the method 320. In other examples, different components of an example device or system that implements the method 320 may perform functions at substantially the same time or in a specific sequence.

In some embodiments, the method 320 includes receiving a photo of a particular user from a corporate directory by the authentication system at step 322. For example, as illustrated in FIGS. 2A and 2B, trusted authentication provider 160 may receive a photo of a user 110 from corporate directory 220.

In some embodiments, the method 320 includes creating, by the authentication system, a reference model for authenticating the particular user by facial recognition using the photo of the particular user from the corporate directory and a reference image of the particular user captured by user equipment at step 324. For example, as illustrated in FIGS. 2A and 2B, trusted authentication provider 160 illustrated in FIGS. 2A and 2B may create a reference model for authenticating user 110 by facial recognition, where the reference model uses the photo of the user 110 from corporate directory 220 and a reference image of user 110 captured by CMFA device 120. This reference model can ultimately be used to determine whether an adversary 210 has obtained unauthorized access on a devices such as CMFA device 120 normally used and operated by an authorized user such as user 110. By using photos from the corporate directory as well as the reference image, trusted authentication provider 160 has a larger training set upon to use in the creation of the reference model.

In some embodiments, the method 320 includes receiving a request from a person to authenticate the person as the particular user by the authentication system to a device or service at step 326. For example, as illustrated in FIGS. 2A and 2B, trusted authentication provider 160 may receive a request from user 110 to authenticate user 110 as user 110 to a device or service, such as a secure internal resource operated by an enterprise.

In some embodiments, the method 320 includes comparing a current image of the person captured by the user equipment against the reference model at step 328. For example, as illustrated in FIGS. 2A and 2B, trusted authentication provider 160 may compare a current image of user 110 captured by CMFA device 120 against the reference model for user 110. The use of this as one of potentially many factors in a multi-factor authentication system can help increase confidence that the person is actually the particular user.

In some embodiments, the method 320 includes authenticating the person as the particular user to the device or service when the current image sufficiently matches the reference model at step 330. For example, as illustrated in FIGS. 2A and 2B, trusted authentication provider 160 may authenticate user 110 as user 110 to the device or service when the current image of user 110 sufficiently matches the reference model of user 110.

Figure 3C:
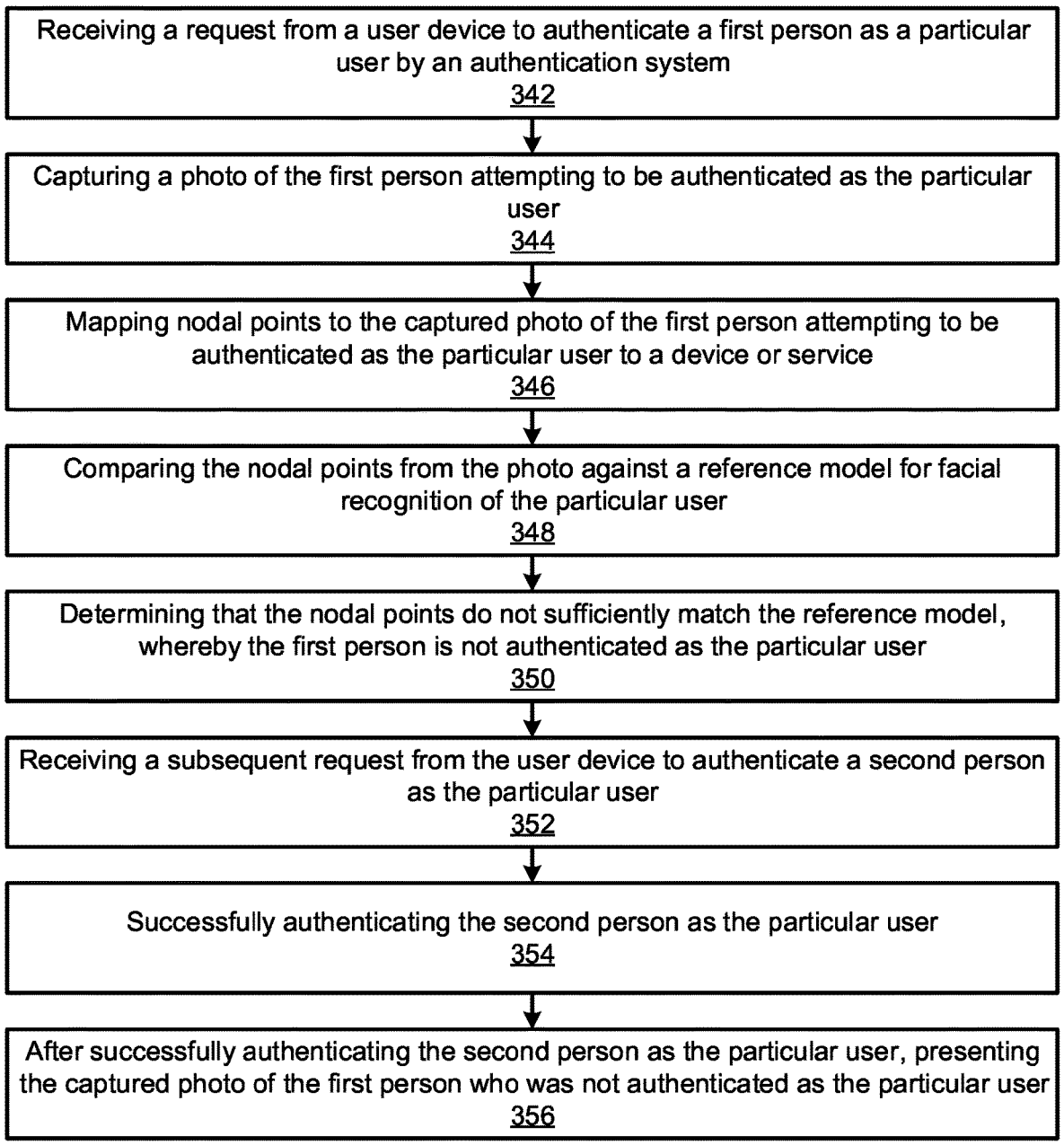

FIG. 3C illustrates an example method 340 for increasing security of devices that leverages an integration of an authentication system with at least one corporate service. Although the example method 340 depicts a particular sequence of operations, the sequence may be altered without departing from the scope of the present disclosure. For example, some of the operations depicted may be performed in parallel or in a different sequence that does not materially affect the function of the method 340. In other examples, different components of an example device or system that implements the method 340 may perform functions at substantially the same time or in a specific sequence.

In some embodiments, the method 340 includes receiving a request from a user device to authenticate a first person as a particular user by the authentication system at step 342. For example, as illustrated in FIGS. 2A and 2B, trusted authentication provider 160 may receive a request from CMFA device 120 to authenticate adversary 210 as user 110.

In some embodiments, the method 340 includes capturing a photo of the first person attempting to be authenticated as the particular user at step 344. For example, as illustrated in FIGS. 2A and 2B, trusted authentication provider 160 may, via CMFA device 120, capture a photo of adversary 210 attempting to be authenticated as user 110. This photo can be used for later identification of the first person if it turns out the first person was an unauthorized user engaged in a data breach.

In some embodiments, the method 340 includes mapping nodal points to the captured photo of the first person attempting to be authenticated as the particular user to a device or service at step 346. For example, as illustrated in FIGS. 2A and 2B, trusted authentication provider 160 may map nodal points to the captured photo of adversary 210 attempting to be authenticated as user 110 to a device or service, such as a secure internal resource operated by an enterprise.

In some embodiments, the method 340 includes comparing the nodal points from the photo against a reference model for facial recognition of the particular user at step 348. For example, as illustrated in FIGS. 2A and 2B, trusted authentication provider 160 may compare the nodal points from the photo of adversary 210 against a reference model for facial recognition of user 110. The reference model for the particular user can be developed from assets available in a corporate directory or other corporate service.

In some embodiments, the method 340 includes determining that the nodal points do not sufficiently match the reference model, whereby the first person is not authenticated as the particular user at step 350. For example, as illustrated in FIGS. 2A and 2B, trusted authentication provider 160 may determine that the nodal points from the photo of adversary 210 do not sufficiently match the reference model of user 110, whereby adversary 210 is not authenticated as user 110.

In some embodiments, the method 340 includes receiving a subsequent request from the user device to authenticate a second person as the particular user at step 352. For example, as illustrated in FIGS. 2A and 2B, trusted authentication provider 160 may receive a subsequent request from CMFA device 120 to authenticate user 110 as the user 110.

In some embodiments, the method includes successfully authenticating the second person as the particular user at step 354. For example, as illustrated in FIGS. 2A and 2B, trusted authentication provider 160 may successfully authenticate user 110 as user 110. At this point, the user device and the authentication provider, having successfully authenticated the second person as the particular user, will want to In some embodiments, the method 340 includes, after successfully authenticating the second person as the particular user, presenting the captured photo of the first person who was not authenticated as the particular user at step 356. For example, as illustrated in FIGS. 2A and 2B, trusted authentication provider 160 may, after successfully authenticating user 110 as user 110, present the captured photo of adversary 210. Once the captured photo of the first person is presented to the second person, the second person can determine whether or not the first person is an authorized user. When the first person is disavowed by the second person, that information can be conveyed to an entity like trusted authentication provider 160, which can subsequently issue commands to further identify the first person or secure the device, or enlist the help of a corporate security service to identify and track the first person.

Figure 3D:
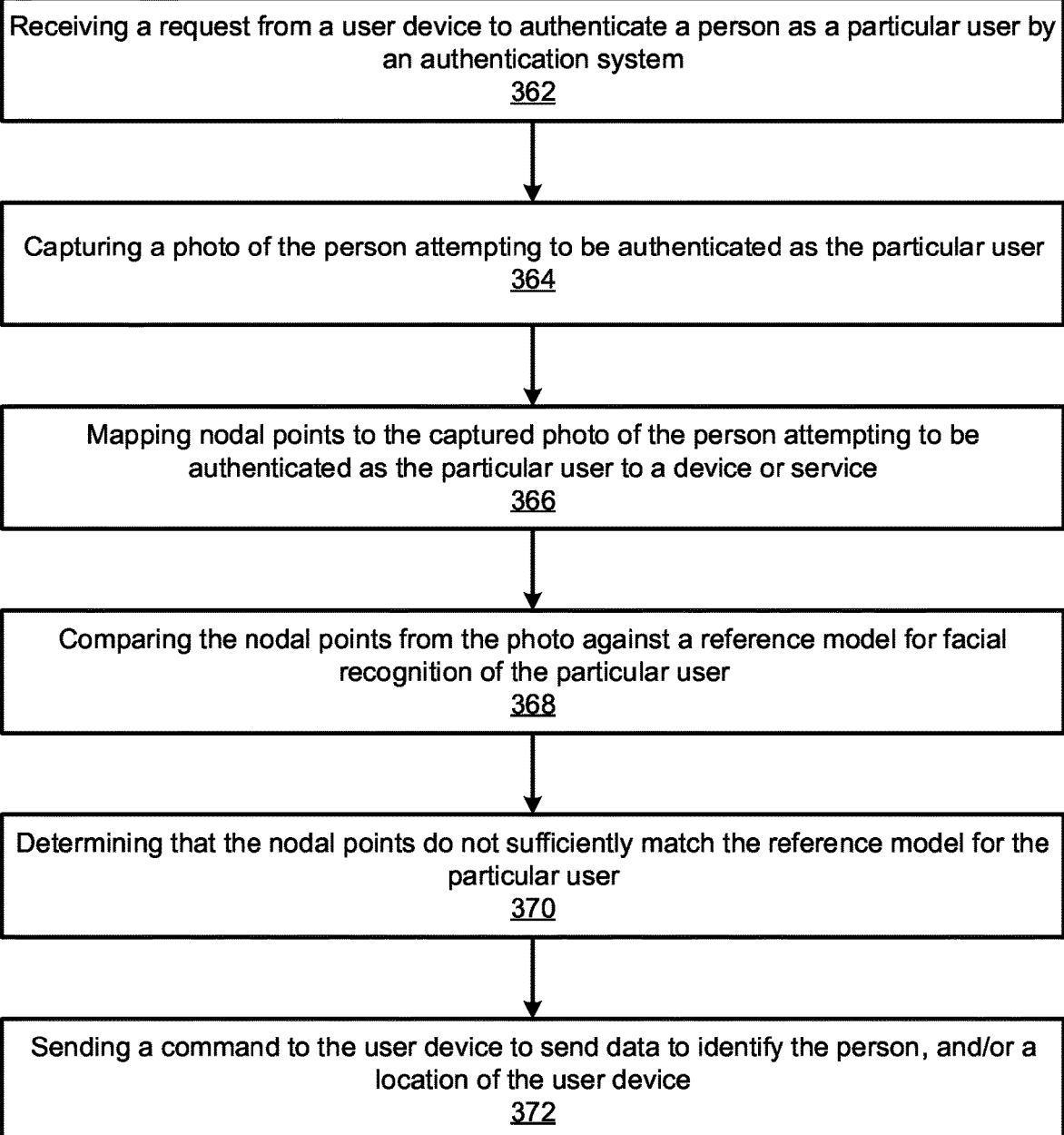

FIG. 3D illustrates an example method 360 for increasing security of devices that leverages integration of an authentication system with at least one corporate service. Although the example method 360 depicts a particular sequence of operations, the sequence may be altered without departing from the scope of the present disclosure. For example, some of the operations depicted may be performed in parallel or in a different sequence that does not materially affect the function of the method 360. In other examples, different components of an example device or system that implements the method 360 may perform functions at substantially the same time or in a specific sequence.

In some embodiments, the method 360 includes receiving a request from a user device to authenticate a person as a particular user by the authentication system at step 362. For example, as illustrated in FIGS. 2A and 2B, trusted authentication provider 160 may receive a request from CMFA device 120 to authenticate adversary 210 as user 110.

In some embodiments, the method 360 includes capturing a photo of the person attempting to be authenticated as the particular user at step 364. For example, as illustrated in FIGS. 2A and 2B, trusted authentication provider 160 may, via CMFA device 120, capture a photo of adversary 210 attempting to be authenticated as user 110.

In some embodiments, the method 360 includes mapping nodal points to the captured photo of the person attempting to be authenticated as the particular user to a device or service at step 366. For example, as illustrated in FIGS. 2A and 2B, trusted authentication provider 160 map nodal points to the captured photo of adversary 210.

In some embodiments, the method 360 includes comparing the nodal points from the photo against a reference model for facial recognition of the particular user at step 368. For example, as illustrated in FIGS. 2A and 2B, trusted authentication provider 160 may compare the nodal points from the photo of adversary 210 against a reference model for facial recognition of user 110.

In some embodiments, the method 360 includes determining that the nodal points do not sufficiently match the reference model for the particular user at step 370. For example, as illustrated in FIGS. 2A and 2B, trusted authentication provider 160 may determine that the nodal points from the photo of adversary 210 do not sufficiently match the reference model for user 110.

In some embodiments, the method 360 includes sending a command to the user device to send data to identify the person, and/or a location of the user device at step 372. For example, as illustrated in FIGS. 2A, trusted authentication provider 160 may send a command to CMFA device 120 to send data to identify the person, and/or a location of the user device. The command can be to send the captured photo of the person that attempted to be authenticated as the particular user, i.e. the captured photo of adversary 210. The command can be to send a GPS location or activity that the person engaged in on the device. The command can be to gather more data via the device by recording and streaming video and/or audio data. These data requests serve two purposes: 1) they can paint a fuller picture of the identity of the person engaging in unauthorized use of the device for future identification, and 2) they can paint a fuller picture of the security breach. These data can determine how the investigation will proceed. The command can be to send the captured photo of the person that attempted to be authenticated as the particular user.

In some examples of step 372, the method 360 includes, prior to sending the command, receiving a communication from a second device operated by a second person who is authenticated as the particular user stating that the user device is lost or stolen. For example, as illustrated in FIGS. 2A, trusted authentication provider 160 may, prior to sending the command, receive a communication from a second device operated by user 110 who is authenticated as user 110 stating that CMFA device 120 is lost or stolen. The second device can be a personal device, such as a laptop or phone owned by user 110, or an enterprise device used and operated by user 110. In this case, the authentication system can be sure that unauthorized access has occurred and can respond appropriately in accordance with enterprise policies.

Figure 3E:
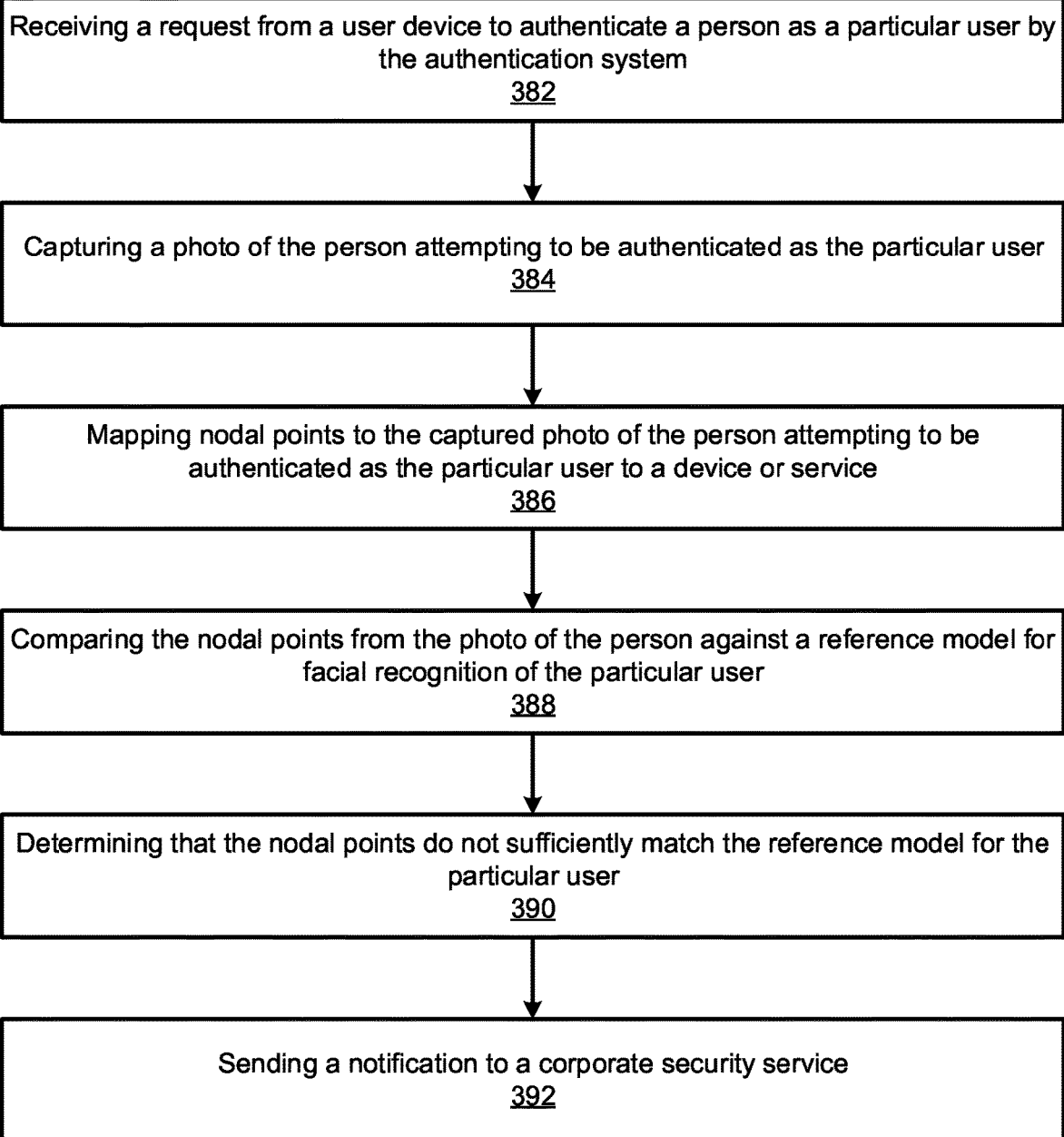

FIG. 3E illustrates an example method 380 for increasing security of devices that leverages an integration of an authentication system with at least one corporate service. Although the example method 380 depicts a particular sequence of operations, the sequence may be altered without departing from the scope of the present disclosure. For example, some of the operations depicted may be performed in parallel or in a different sequence that does not materially affect the function of the method 380. In other examples, different components of an example device or system that implements the method 380 may perform functions at substantially the same time or in a specific sequence.

In some embodiments, the method 380 includes receiving a request from a user device to authenticate a person as a particular user by the authentication system at step 382. For example, as illustrated in FIGS. 2A and 2B, trusted authentication provider 160 may receive a request from CMFA device 120 to authenticate adversary 210 as user 110.

In some embodiments, the method 380 includes capturing a photo of the person attempting to be authenticated as the particular user at step 384. For example, as illustrated in FIGS. 2A and 2B, trusted authentication provider 160 may, via CMFA device 120, capture a photo of adversary 210 attempting to be authenticated as user 110.

In some embodiments, the method 380 includes mapping nodal points to the captured photo of the person attempting to be authenticated as the particular user to a device or service at step 386. For example, as illustrated in FIGS. 2A and 2B, trusted authentication provider 160 may map nodal points to the captured photo of adversary 210.

In some embodiments, the method 380 includes comparing the nodal points from the photo of the person against a reference model for facial recognition of the particular user at step 388. For example, as illustrated in FIGS. 2A and 2B, trusted authentication provider 160 may compare the nodal points from the photo of adversary 210 against a reference model for facial recognition of user 110.

In some embodiments, the method 380 includes determining that the nodal points do not sufficiently match the reference model for the particular user at step 390. For example, as illustrated in FIGS. 2A and 2B, trusted authentication provider 160 may determine that the nodal points from the photo of adversary 210 do not sufficiently match the reference model for user 110.

In some embodiments, the method 380 includes sending a notification to a corporate security service at step 392. For example, as illustrated in FIG. 2B, trusted authentication provider 160 may send a notification to corporate security service 230. This notification can include information about what device was breached, what access level the device is authorized for, information about the identity of the person who accessed the device (especially if they were recognized using the corporate directory), the location of the breach, how many breaches have occurred in recent history in that location or in general, or other factors. This can help the corporate security service ultimately identify, apprehend, and prosecute the adversary.

In some examples of the method 380, the corporate security service includes a location services platform and the method includes determining a current location of the user device. For example, as illustrated in FIGS. 2A and 2B, trusted authentication provider 160 may determine a current location of CMFA device 120 using information obtained from corporate security service 230.

Trusted authentication provider 160 can use the current location of CMFA device 120 to better identify adversary 210. The method 380 can include instructing a video surveillance system to stream video from cameras in a vicinity of the current location of the user device to security personnel, which can be used to help identify and apprehend the adversary. The method 380 can include instructing a video surveillance system to record video from cameras in a vicinity of the current location of the user device, and to tag the recorded video with an automatically generated incident case file. The method 380 can include sending the captured photo of the person who was not authenticated as the particular user to a video surveillance system and instructing the video surveillance system to perform facial recognition of objects within view of the video surveillance system to identify the person in the captured photo. The corporate security service can also be sent a reference model, if available, for the adversary. The video surveillance system can identify and track adversary 210, even if the adversary leaves the vicinity.

Figure 4:
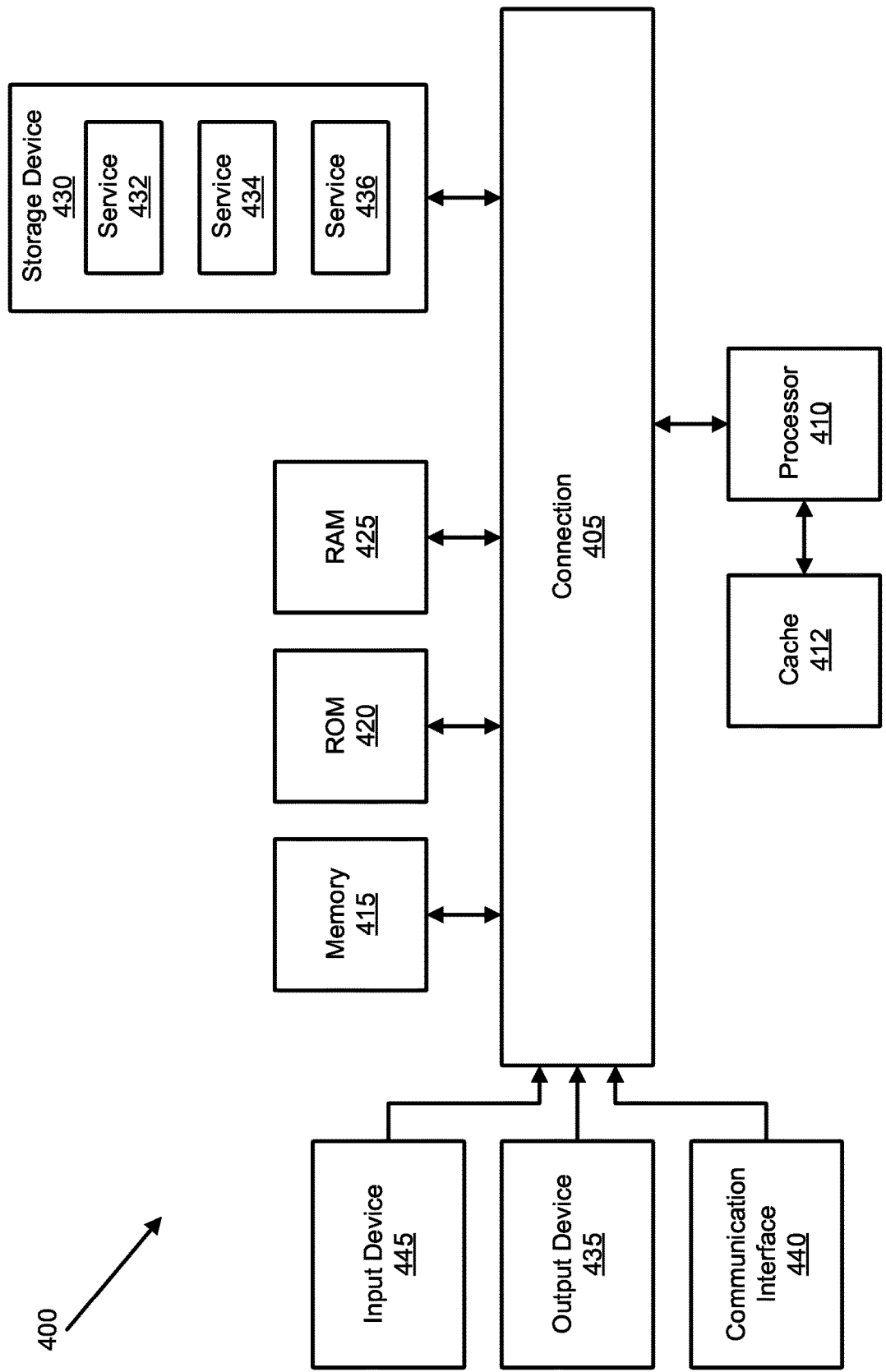
FIG. 4 shows an example of computing system 400, which can be for example any computing device that can implement components of the system.

FIG. 4 shows an example of computing system 400, which can be for example any computing device making up CMFA device 120 or trusted authentication provider 160 or any component thereof in which the components of the system are in communication with each other using connection 405. Connection 405 can be a physical connection via a bus, or a direct connection into processor 410, such as in a chipset architecture. Connection 405 can also be a virtual connection, networked connection, or logical connection.

In some embodiments computing system 400 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 400 includes at least one processing unit (CPU or processor) 410 and connection 405 that couples various system components including system memory 415, such as read only memory (ROM) 420 and random access memory (RAM) 425 to processor 410. Computing system 400 can include a cache of high-speed memory 412 connected directly with, in close proximity to, or integrated as part of processor 410.

Processor 410 can include any general purpose processor and a hardware service or software service, such as services 432, 434, and 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction, computing system 400 includes an input device 445, which can represent any number of input mechanisms, such as a microphone for speech, a touch-sensitive screen for gesture or graphical input, keyboard, mouse, motion input, speech, etc. Computing system 400 can also include output device 435, which can be one or more of a number of output mechanisms known to those of skill in the art. In some instances, multimodal systems can enable a user to provide multiple types of input/output to communicate with computing system 400. Computing system 400 can include communications interface 440, which can generally govern and manage the user input and system output. There is no restriction on operating on any particular hardware arrangement and therefore the basic features here may easily be substituted for improved hardware or firmware arrangements as they are developed.

Storage device 430 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 430 can include software services, servers, services, etc., that when the code that defines such software is executed by the processor 410, it causes the system to perform a function. In some embodiments, a hardware service that performs a particular function can include the software component stored in a computer-readable medium in connection with the necessary hardware components, such as processor 410, connection 405, output device 435, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method for integrating an authentication system with at least one corporate service comprising:
   receiving a request from a user device to authenticate a person as a specific user by the authentication system;
   capturing a photo of the person attempting to be authenticated as the specific user;
   determining, based on facial recognition, that the person in the photo does not match a reference model for the specific user;
   based on the mismatch of the person and the specific user, determining the person is an adversary and initiating identification of the person; and
   instructing a video surveillance system to stream video from cameras in a vicinity of a current location of the user device to security personnel.

2. The method of claim 1, wherein determining the person is an adversary and initiating identification of the person comprises:
   receiving a reference photo of the specific user from a corporate directory;
   comparing the photo of the person with the reference photo; and
   based on a mismatch between the photo of the person with the reference photo, send a notification to an authentication service that the person has unsuccessfully attempted to authenticate as the specific user of the user device.

3. The method of claim 1, wherein based on the mismatch of the person and the specific user, a video surveillance system is triggered to activate and capture video of the person that has unsuccessfully attempted to authenticate as the specific user of the user device.

4. The method of claim 3, wherein the video surveillance system further performs facial recognition to identify the person that has unsuccessfully attempted to authenticate as the specific user of the user device.

5. The method of claim 1, further comprising:
   mapping nodal points to the captured photo of the person attempting to be authenticated as the specific user to a device or service;
   comparing the nodal points from the photo against a reference model for facial recognition of the specific user; and
   determining that the nodal points of the person in the photo does match the reference model for the specific user.

6. The method of claim 1, wherein a command is sent to the user device to send the captured photo of the person and a location of the user device that attempted to be authenticated as the specific user.

7. The method of claim 1, wherein a command is sent to record and send video and/or audio data of the person who attempted to be authenticated as the specific user from the user device.

8. The method of claim 1, further comprising:
   prior to sending a command to the user device to send the captured photo of the person, receiving a communication from a second device operated by a second person who is authenticated as the specific user stating that the user device is lost or stolen.

9. A non-transitory computer-readable medium having stored therein instructions for integrating an authentication system with at least one corporate service which, when executed by a processor, causes the processor to perform operations comprising:
   receiving a request from a user device to authenticate a person as a specific user by the authentication system;
   capturing a photo of the person attempting to be authenticated as the specific user;
   determining, based on facial recognition, that the person in the photo does not match a reference model for the specific user;
   based on the mismatch of the person and the specific user, determining the person is an adversary and initiating identification of the person; and
   instructing a video surveillance system to stream video from cameras in a vicinity of a current location of the user device to security personnel.

10. The non-transitory computer-readable medium of claim 9, the processor further performing operations comprising:
    receiving a reference photo of the specific user from a corporate directory;
    comparing the photo of the person with the reference photo; and
    based on a mismatch between the photo of the person with the reference photo, send a notification to an authentication service that the person has unsuccessfully attempted to authenticate as the specific user of the user device.

11. The non-transitory computer-readable medium of claim 9, wherein based on the mismatch of the person and the specific user, a video surveillance system is triggered to activate and capture video of the person that has unsuccessfully attempted to authenticate as the specific user of the user device.

12. The non-transitory computer-readable medium of claim 11, whereby the video surveillance system can identify the person and track the person.

13. The non-transitory computer-readable medium of claim 11, wherein the video surveillance system further performs facial recognition to identify the person that has unsuccessfully attempted to authenticate as the specific user of the user device.

14. The non-transitory computer-readable medium of claim 9, the processor further performing operations comprising:

mapping nodal points to the captured photo of the person attempting to be authenticated as the specific user to a device or service;

comparing the nodal points from the photo against a reference model for facial recognition of the specific user; and determining that the nodal points of the person in the photo does match the reference model for the specific user.

15. The non-transitory computer-readable medium of claim 9, wherein a corporate security service includes a location services platform, the instructions further effective to cause the processor to perform operations comprising:

determining a current location of the user device.

16. The non-transitory computer-readable medium of claim 9, the instructions further effective to cause the processor to perform operations comprising:

instructing a video surveillance system to record video from cameras in a vicinity of a current location of the user device, and to tag the recorded video with an automatically generated incident case file.

17. The non-transitory computer-readable medium of claim 9, the instructions further effective to cause the processor to perform operations comprising:

sending the captured photo of the person who was not authenticated as the specific user to a video surveillance system; and instructing the video surveillance system to perform facial recognition of objects within view of the video surveillance system to identify the person in the captured photo.

18. A system comprising:

an authentication server;

a user device;

an authentication application configured to execute on the user device, and in communication with the authentication server, wherein a function of the authentication application is to authenticate that a person operating the user device is a specific user by:

receiving a request from a user device to authenticate a person as a specific user by the authentication system;

capturing a photo of the person attempting to be authenticated as the specific user;

determining, based on facial recognition, that the person in the photo does not match a reference model for the specific user;

based on the mismatch of the person and the specific user, determining the person is an adversary and initiating identification of the person; and instructing a video surveillance system to stream video from cameras in a vicinity of a current location of the user device to security personnel.

19. The system of claim 18, wherein the authentication server is configured to receive a receive a photo of the specific user from a corporate directory, and to create a reference model for authenticating the specific user by facial recognition using the photo of the specific user from the corporate directory and a reference image of the specific user captured by user equipment.

* * * * *